United States Patent [19]
Schiller et al.

[11] Patent Number: 5,972,149
[45] Date of Patent: Oct. 26, 1999

[54] METHOD FOR MAKING A SEAT USING A PRESSURED BLADDER

[75] Inventors: Steven C. Schiller, Menomonee Falls; John J. Kucharski, Brown Deer; Michael R. Schwingshakl, South Milwaukee, all of Wis.

[73] Assignee: Milsco Manufacturing Company, Milwaukee, Wis.

[21] Appl. No.: 09/062,981

[22] Filed: Apr. 20, 1998

[51] Int. Cl.[6] .................................................. B29C 33/04
[52] U.S. Cl. .......................... 156/213; 156/212; 156/311; 156/583.3; 425/509
[58] Field of Search ..................................... 156/212, 213, 156/311, 313, 324.4, 358, 581, 583.3; 425/387.1, 389, 501, 509

[56] References Cited

U.S. PATENT DOCUMENTS

| | | |
|---|---|---|
| 2,335,624 | 11/1942 | Weir . |
| 2,387,566 | 10/1945 | Custers . |
| 3,368,323 | 2/1968 | Wood . |
| 3,408,242 | 10/1968 | Rochla . |
| 3,607,544 | 9/1971 | Earner et al. . |
| 4,334,850 | 6/1982 | Garabedian .............................. 425/388 |
| 4,357,723 | 11/1982 | Zelkowitz . |
| 4,465,534 | 8/1984 | Zelkowitz . |
| 4,623,419 | 11/1986 | Price . |
| 4,692,199 | 9/1987 | Kozlowski et al. . |
| 4,874,448 | 10/1989 | Urai . |
| 4,925,513 | 5/1990 | Witke et al. . |
| 4,975,135 | 12/1990 | Lowe . |
| 5,000,805 | 3/1991 | Lowe . |
| 5,176,777 | 1/1993 | Guilhem . |
| 5,232,543 | 8/1993 | Frelich et al. . |
| 5,286,325 | 2/1994 | Miyota et al. . |
| 5,372,667 | 12/1994 | Miyota et al. . |
| 5,372,668 | 12/1994 | Bracesco . |
| 5,395,473 | 3/1995 | Nixon . |
| 5,403,421 | 4/1995 | Hinterseer . |
| 5,407,510 | 4/1995 | Marfilius et al. . |
| 5,472,549 | 12/1995 | Jurrius et al. . |
| 5,486,252 | 1/1996 | Wong . |
| 5,534,097 | 7/1996 | Fasano et al. . |
| 5,554,252 | 9/1996 | Foran ..................................... 156/311 |
| 5,635,014 | 6/1997 | Taylor .................................. 156/583.3 |
| 5,743,982 | 4/1998 | Marfilius et al. ...................... 156/212 |

*Primary Examiner*—Jeff H. Aftergut
*Assistant Examiner*—Barbara J. Musser
*Attorney, Agent, or Firm*—Nilles & Nilles S.C.

[57] ABSTRACT

A method of making a seat (10) includes preassembling the seat by positioning a seat cover (26) over a contoured foam substrate (18) with a layer of heat activated adhesive (24) between the seat cover and the foam substrate. Securing the seat preassembly (10') in a fixture (106) and introducing heating fluid into the fixture to pressurize a flexible bladder (156) against the seat. The pressurized bladder urges the seat cover against the contoured foam substrate and heats the adhesive layer. Next, cooling fluid is introduced into the fixture to pressurize the flexible bladder against the seat, and the pressurized bladder urges the seat cover against the contoured foam substrate and cools the adhesive layer.

34 Claims, 9 Drawing Sheets

METHOD FOR MAKING A SEAT USING A PRESSURED BLADDER

BACKGROUND OF THE INVENTION

1. Field of the Invention

The present invention relates generally to seats and to the manufacture of seats, and more particularly, to a method and apparatus for making a seat including a seat cover bonded to a contoured foam substrate.

2. Discussion of the Related Art

Padded seat assemblies, and particularly padded seat assemblies for motorcycles and similar vehicles, are typically constructed using a foam substrate covered by it seat cover. The foam substrate is generally formed by expanding foam within a mold to the contoured shape of the finished seat assembly. The seat cover is secured tightly over the foam substrate so that it generally conforms to the contour of the foam substrate. The seat cover may be a cloth, leather, vinyl or any other similar material. A very stylish and popular seat assembly type is a bucket seat assembly having a concave seating surface. This seat assembly type presents some difficulty in manufacturing to ensure that the seat cover closely matches the concave seating surface.

In the past, buttons, stitching or similar fasteners were passed through the seat cover and the foam substrate to cause the seat cover to more closely conform to the concave contour of the foam substrate. This method of securing the seat cover has a number of disadvantages. For example, the seat cover may be locally weakened where the fastener passes through the seat cover. Also, the holes necessarily formed in the seat cover may allow moisture to seep into the foam substrate and/or moisture in the foam substrate to seep onto the seating surface. Finally, the fasteners may introduce wrinkles into the seat cover that may be aesthetically unappealing.

To provide a smooth surface finish to the seat assembly and to cause the seat cover to closely follow the contour of the foam substrate, it is now known to adhesively bond the seat cover to the foam substrate. Bonding the seat cover to the foam substrate ensures that the seat cover remains in close intimate contact with and conforms nearly identically to the contour of the foam substrate. Also, adhesively bonding the seat cover to the foam substrate advantageously eliminates the need for passing buttons or other fasteners through the seat cover for securing it closely to the foam substrate. This prevents tearing of the seat cover, simplifies the manufacturing process and overall provides a better looking more durable seat assembly.

It is generally known to use a heat source to heat and thus activate a layer of adhesive disposed between the foam substrate and the seat cover to adhesively bond the !;eat cover to the foam substrate. This process allows positioning of the seat cover over the foam substrate before activating the adhesive, and thus, allows accurate positioning of the seat cover before permanently bonding it to the foam substrate. For example, U.S. Pat. No. 5,407,510 discloses a method of making a seat where a foam substrate, clamped against a vacuum table, is urged along with a layer of adhesive and a seat cover against a heated fluidized bed that heats and activates the adhesive. Thereafter, the seat cushion is withdrawn from the fluidized bed. A vacuum may then be used to draw cool air through the seat cushion to cool it. The fluidized bed consists of beads of glass held captive by a flexible and permeable membrane cloth with heated air pumped through the glass beads to urge them upwardly against the membrane. The membrane is compliant so as to conform to the contour of the seat cushion.

In U.S. Pat. No. 5,176,777 a method of making a seat using a fluidized bed similar to that disclosed in the '510 patent is disclosed. Air is introduced into a chamber fluidizing glass beads contained within the chamber. A seat cover is placed on the top of a porous membrane that permits air flow through the membrane but retains the beads within the housing. A foam substrate is urged against the seat cover into the fluidized bed until the membrane of the fluidized bed conforms to the contours of the foam substrate. A heating coil is then activated to heat the air within the fluidized bed to, in turn, heat and activate an adhesive deposited between the seat cover and the foam substrate. No cooling is performed by the fluidized bed, and the process of activating the adhesive is rather slow.

U.S. Pat. No. 5,543,097 discloses a method of making a seat assembly where magnetic particles in the adhesive are inductively excited to generate heat to melt the adhesive. A vacuum is applied to urge the seat cover and adhesive sheet against a contoured cavity of a rigid mold bearing the general contour of the seat cushion desired to be produced. A pre-contoured foam substrate is thereafter placed into the mold against the adhesive layer. An electric current is introduced to a series of coils inside the mold to inductively heat the adhesive while a coolant flows through the coils to keep the foam substrate cool. During operation, a press urges the foam substrate against the adhesive and seat cover. This method may not provide uniform heating of the adhesive and subsequent uniform cooling of the adhesive. Additionally, the process requires rather expensive inductively activated adhesive.

It is also known to use steam as a heat source for heating and activating an adhesive layer between the foam substrate and the seat cover. An example of such a method is disclosed in U.S. Pat. No. 5,372,668 where cannulae or hollow needles pierce the foam substrate to introduce steam into the cushion relatively close to the adhesive between the foam substrate and seat cover. U.S. Pat. Nos. 5,372,667 and 5,286,325 disclose a method of making a seat assembly where the foam substrate is coated with an adhesive, and a press urges the foam substrate, adhesive and seat cover against a mold having holes in it. The holes allow steam to be introduced into the mold and to directly heat the adhesive. Thereafter, the seat assembly is transferred to a cooling mold to cool and set the adhesive. And, U.S. Pat. No. 5,232,543 discloses a method of making a seat assembly utilizing tubes with holes in the tubes to spray steam into the seat cover fabric to heat the adhesive. A vacuum source is turned on after steam has been introduced to evacuate the steam and any water that has condensed in the seat cover fabric. These methods introduce steam directly to the finished product. Steam condensing on the seat cover may damage the material while wetting of the foam substrate may require additional drying steps. Moreover, releasing steam directly into the working environment may potentially pose a worker safety concern.

U.S. Pat. No. 5,486,252 discloses a method of making a seat cushion using a flexible planar electric heating element made of silicone and heating coils that is placed between the cover and foam substrate to heat the adhesive. Thereafter, the heater is removed and pressure is applied to the seat cover and foam substrate to urge them together. Pressurized cooling air is then introduced into a porous fixture of a press that bears against the seat cover fabric to cool and set the adhesive.

While the use of adhesive bonding of the seat cover to the foam substrate has greatly improved seat assembly quality, the use of adhesives, and particularly heat activated adhesives, still pose a number of manufacturing problems.

For example, a heat activated adhesive, such as a thermoplastic adhesive, does not gain strength until it is cooled significantly from the heated, activated state. Any movement of the seat assembly during this time can cause the seat cover to separate from the foam substrate resulting in a defective seat assembly. Defective seat assemblies must be rejected and either reworked or scrapped at considerable expense.

Moving the heated seat assembly from a heating fixture to a cooling fixture, in addition to adding to manufacturing complexity and cycle time, introduces an opportunity to separate the seat cover from the foam substrate before cooling, and thus setting, the adhesive. Heating the adhesive prior to bringing the seat cover into contact with the foam substrate in a cooling fixture presents other problems. For example, it is difficult to uniformly control the temperature of the adhesive either on the surface of the seat cover or on the surface of the foam substrate. Moreover, it is a very difficult task to manipulate the seat cover relative to the foam substrate while the adhesive is tacky, i.e., activated. If the seat cover is not initially perfectly aligned with the foam substrate, subsequent attempts to align the seat cover are difficult and may result in a separation of the seat cover from the foam substrate. Seat assemblies with misaligned seat covers or improperly bonded seat covers are unacceptable.

SUMMARY OF THE INVENTION

While many seat making methods are known in the art, none provide a solution to the problem of firmly, accurately, permanently and economically bonding a seat cover to a foam substrate. Seat making presents the difficult problem of having to both (1) heat the seat assembly to activate the adhesive and (2) cool the seat assembly, without moving it from the position in which it was heated, to set the adhesive. In addition, these requirements must to be accomplished with available materials and with sufficiently fast cycle times so as to make the manufacturing process economically feasible.

In accordance with preferred embodiments of the present invention there is provided methods and apparatus for making a seat assembly. In accordance with a first preferred embodiment, heating and cooling of a foam substrate and seat cover to activate, bond and set an adhesive layer is accomplished at a single manufacturing station and without movement of the seat.

Another preferred embodiment of the present invention provides for heating and cooling of the seat assembly using a press and fixture that urge the seat assembly against a flexible bladder. The flexible bladder is pressurized using steam to press the seat cover against the foam substrate while concomitantly heating the adhesive. The flexible bladder is then pressurized using cooling air to maintain the pressure of the seat cover against the foam substrate and to cool and set the adhesive.

In still another preferred embodiment of the present invention, heating and cooling of the seat assembly is accomplished using a portable steam generator and air supply.

More particularly, a preferred method is generally directed to making a motorcycle seat assembly and includes bonding a seat cover to a foam substrate by the use of (1) heat, to activate or melt a layer of adhesive, (2) pressure, to urge the seat cover against the foam substrate, and (3) cooling, to set the adhesive such that the seat cover permanently adheres to the foam substrate. More specifically, the preferred method involves (1) preassembling the seat by (a) placing the seat cover over a layer of adhesive that preferably is a sheet or web of dry thermoplastic adhesive on the foam substrate, (b) pulling the cover generally taut, (c) gathering the seat cover fabric while taut, and (d) tacking it about its periphery to the bottom of the foam substrate, (2) placing the seat assembly face down in a complementarily shaped fixture, (3) clamping the seat against the fixture using a press, (4) introducing steam into the fixture pressurizing an elastomeric (rubber) bladder outwardly against the surface of the seat, (5) heating the surface of the seat by conduction of heat between the bladder and seat surface until the layer of adhesive between the seat cover and foam substrate melts or activates, (6) optionally dwelling for a period of time while the bladder exerts pressure against the seat cover to cause the activated adhesive to more uniformly bond the cover to the cushion, and (6) cooling the surface of the seat by introducing pressurized air into the bladder until the adhesive sets bonding the seat cover to the cushion. Introduction of air into the fixture stops steam flow and evacuates steam from the fixture.

Pressurization of the bladder during both heating and cooling causes the bladder to bear against the seat cover with at least a few pounds of pressure to keep the seat cover in intimate contact with the foam substrate at all times. This provides a superior bond of the seat cover to the foam substrate and prevents formation of bubbles and wrinkles resulting in a seat assembly having a smooth appearance and a uniformly bonded seat cover. The use of a single fixture to both heat and cool the seat advantageously minimizes manufacturing steps by not requiring removal of the seat from the fixture after heating to cool it, such as by transferring it to a cooling fixture or by letting it cool in the ambient air, and the associated potential for damage to the seat assembly. Additionally, cooling by the use of pressurized air, such as shop air, cools and sets the adhesive within about one second of time making the entire cycle of heating, cooling and bonding the seat cover to the foam substrate extremely fast.

In accordance with an alternate preferred embodiment of the present invention, an apparatus consists of a fixture having a top surface that is a flexible bladder, preferably composed of rubber, that expands outwardly when steam or pressurized air is introduced into a hollow cavity within the fixture. The fixture has an inlet permitting entry of steam and air and an outlet to drain liquid that has condensed within the fixture. The fixture also has a compartment for receiving a temperature sensor that detects the temperature within the fixture so that a programmable logic controller can control operation of (1) a solenoid valve that delivers steam to the fixture and (2) another solenoid valve that delivers cool air to the fixture. In this manner the heating cycle, dwell (if required), cooling cycle and dwell (if required) is controlled.

A hose runs from a portable boiler housing to the fixture through which steam or air flows into the fixture. The programmable logic controller and solenoids control operation of the boiler, introduction of steam into the fixture, and introduction of cooling air into the fixture. Another hose from the fixture conveys condensate and steam from the fixture preferably into a condenser that further cools and condenses the remaining steam. The condensate preferably flows into a storage tank that is used as a source of feedwater for the boiler making the apparatus of the invention a substantially self-contained system.

The foam substrate preferably used in the apparatus and method of this invention is constructed of open cell foam that preferably is covered by a "raincoat," for example, a film or sheet of water impervious polyurethane. The raincoat keeps moisture away from and out of the open cell foam. The raincoat also acts to keep moisture that may have accumulated in the open cell foam from seeping through the seat cover when the foam substrate is compressed in use. This is important because a preferred use of the invention is to manufacture seats for motorcycles that are often exposed to rain. In practicing the method, it has been learned that the impervious sheet also prevents the adhesive from migrating into the foam during heating, thereby improving wetting between the foam substrate and the seat cover, forming a better bond between the foam substrate and the seat cover in the finished seat assembly.

The present invention offers significant improvements over the prior art in that a single manufacturing station incorporating a bladder is used to apply pressure and heat to the seat assembly and thereafter apply pressure and cool the seat assembly. The invention also may be implemented in a self-contained, portable apparatus advantageously incorporating a closed steam heating system and an air flow cooling system. The methods in accordance with the present invention are fast, simple, and flexible and each can be implemented in a compact transportable apparatus. While the apparatus and method of this invention is particularly well suited to applying seat covers to a foam substrate in the above mentioned manner, the apparatus and method can also be used to bond virtually any covering to a contoured foam substrate of virtually any shape using an appropriately designed and constructed bladder and fixture.

Additional features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE PREFERRED EMBODIMENTS

1. Seat Assembly

Figure 1:
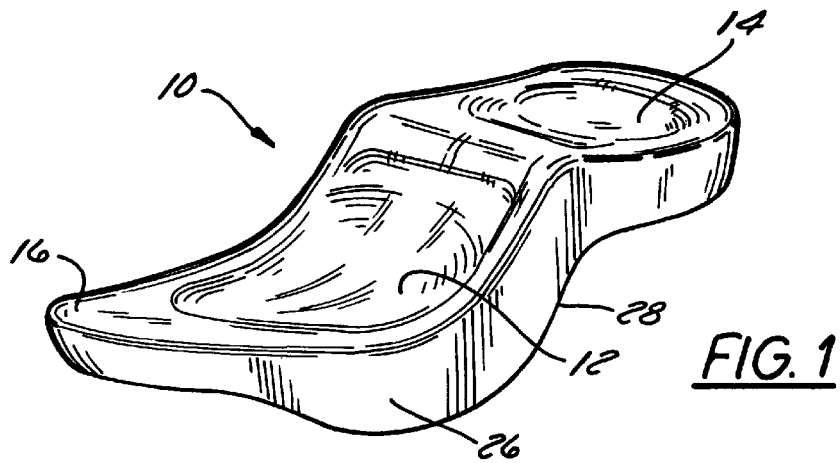
FIG. 1 is a perspective view of a seat assembly manufactured in accordance with the preferred embodiments of the present invention.

Referring to FIG. 1, a seat assembly 10 manufactured in accordance with the preferred embodiments of the present invention is shown. Seat assembly 10 includes a first contoured seating surface 12 and a second contoured seating surface 14. Contoured seating surface 12 and contoured seating surface 14 are each concave with respect to a top surface 16 of seat assembly 10.

Figure 2:
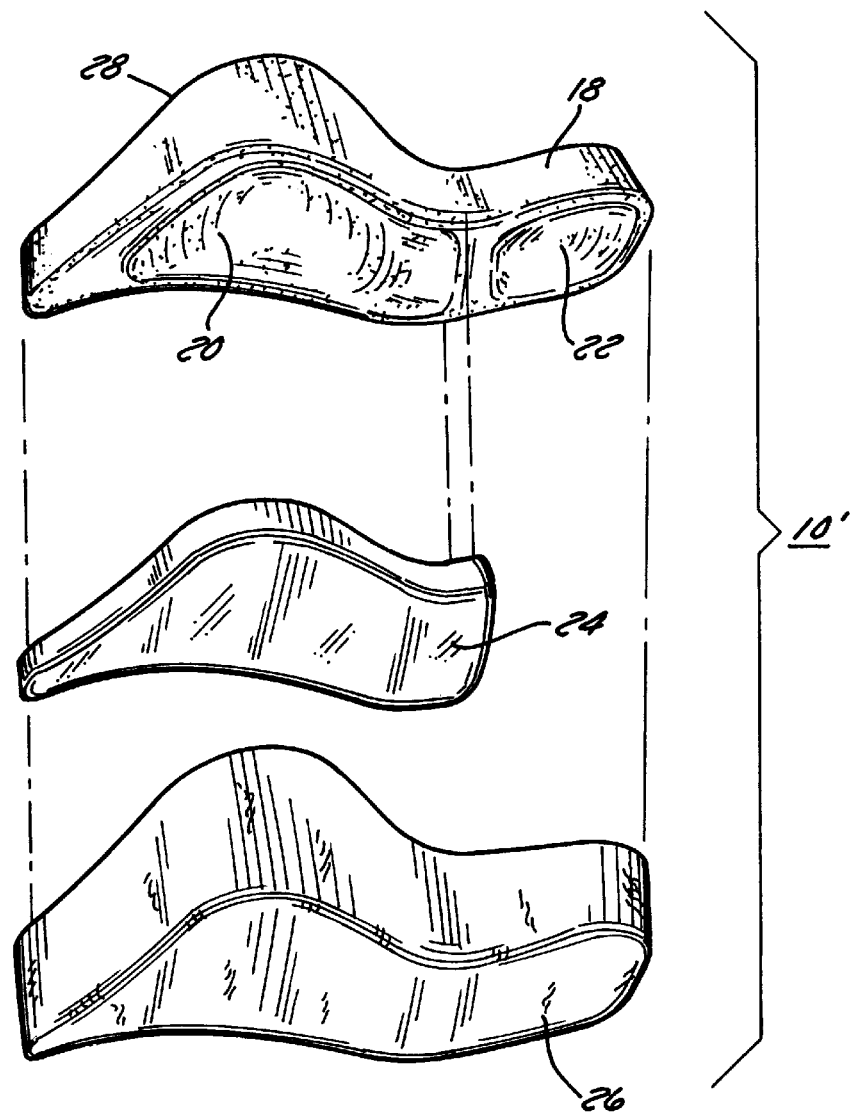
FIG. 2 is an exploded view of a seat preassembly derived from the seal, assembly shown in FIG. 1.

FIG. 2 illustrates seat assembly 10 in exploded assembly view and in a preferred inverted assembly orientation. As best seen therein, seat assembly 10 includes, a contoured foam substrate 18 having a first concave contour 20 and a second concave contour 22 corresponding respectively to first contoured seating surface 12 and second contoured seating surface 14. An adhesive layer 24 is disposed over first concave contour 20. Preferably adhesive layer 24 is a sheet of heat activated adhesive, such as a dry thermoplastic adhesive material, which may be positioned over first concave contour 20. However, in accordance with the preferred embodiments of the present invention, adhesive layer 24 may be any heat activated adhesive which may be applied to first concave contour 20. A seat cover 26 is positioned over foam substrate 18 and is secured about a bottom periphery 28 thereof in a manner that is well known in the art to form a seat preassembly, which is indicated in FIG. 2 as 10'. More specifically, the preferred method involves forming preassembly 10' by (a) placing the seat cover over a layer of adhesive that preferably is a sheet or web of dry thermoplastic adhesive on the foam substrate, (b) pulling the cover generally taut, (c) gathering the seat cover fabric while taut, and (d) tacking it about its periphery to the bottom of the foam substrate.

It is appreciated that while not shown as such in FIG. 2, adhesive layer may be made sufficiently large so as to cover second concave contour 22 and/or a second adhesive layer may be applied to cover second concave contour 22. To simplify the discussion of the preferred embodiments of the present invention and operation of a seat making apparatus 100 (FIG. (3), the discussion herein focuses on securing seat cover 26 to first contoured concave, 20. It is id readily understood that the embodiments of the invention shown may be easily adapted to secure seat cover 26 to second contoured concave 22, and such modifications are well within the skills of one having ordinary skill in the art.

Contoured foam substrate 18 is also preferably coated with a "raincoat" prior to application of adhesive layer 24. A raincoat is a coating of water impervious polyurethane or similar material applied over contoured foam substrate 18. The raincoat prevents water from seeping through seat cover 26 into contoured foam substrate 18 and moisture within contoured foam substrate from seeping out and onto first seating surface 12. The raincoat is also believed to unexpectedly aid the seat cover to contoured foam substrate bonding process. It is believed that the raincoat limits migration of activated adhesive into contoured foam substrate and thus improves wetting between contoured foam substrate 18 and seat cover 26.

2. Seat Making Apparatus

Figure 3:
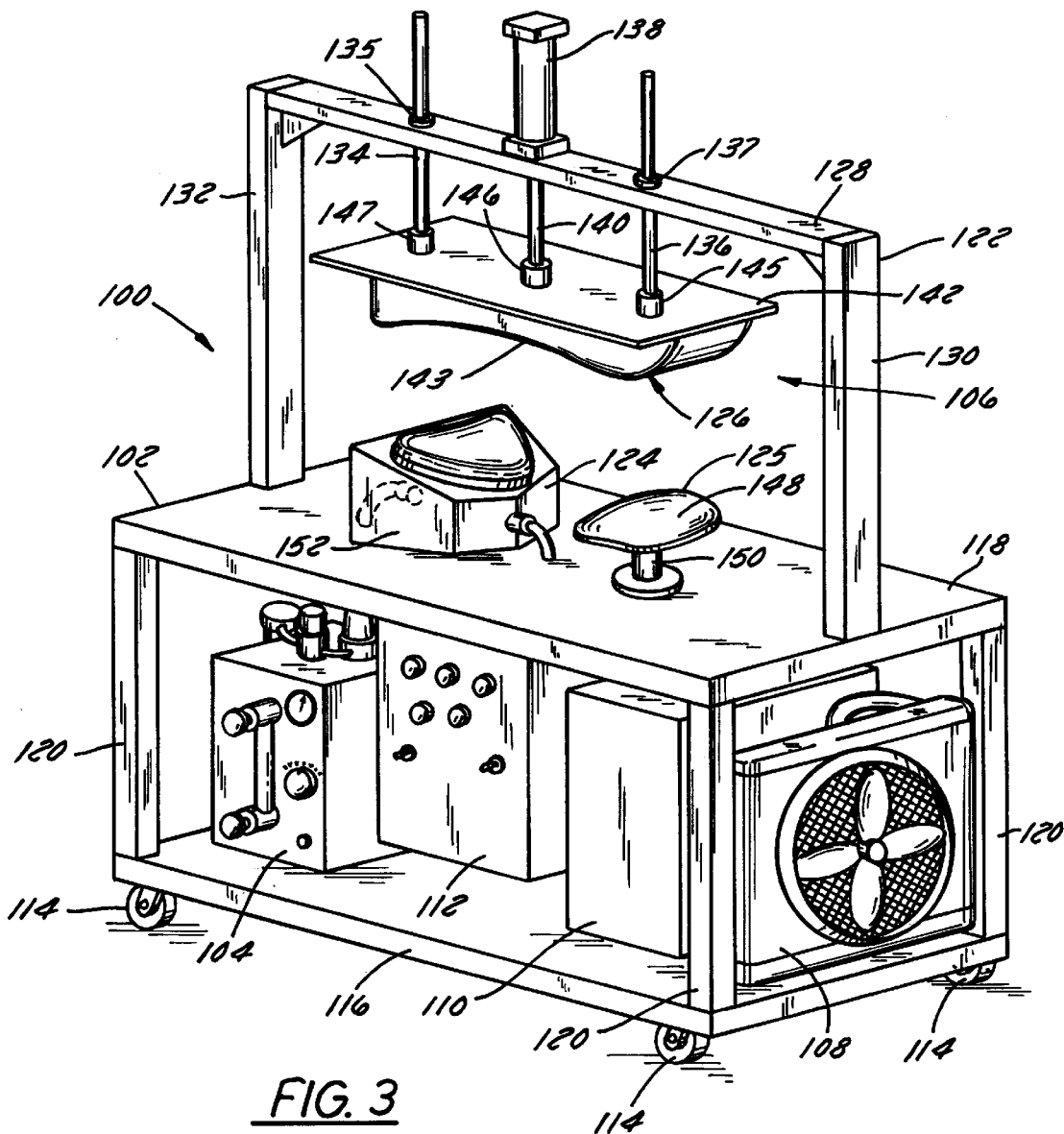
FIG. 3 is a perspective view of an apparatus for making a seat in accordance with a preferred embodiment of the present invention.
Figure 4:
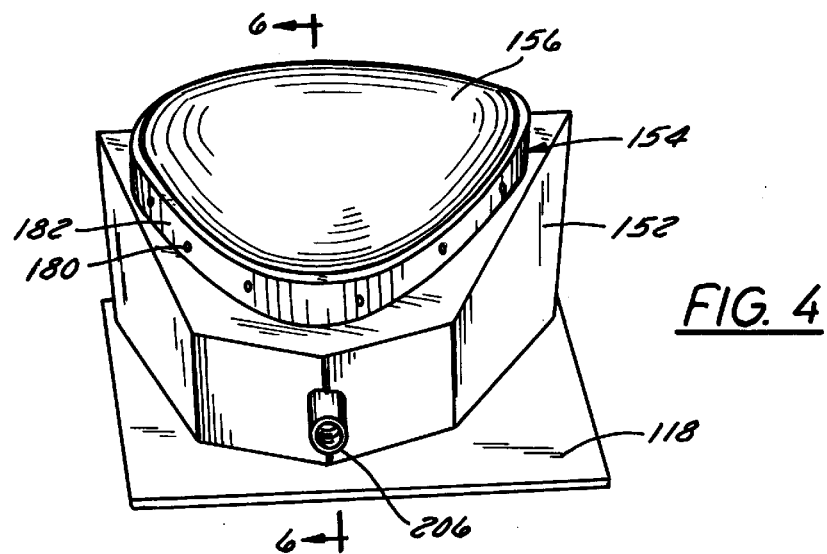
FIG. 4 is a top perspective view of a seat making fixture.
Figure 5:
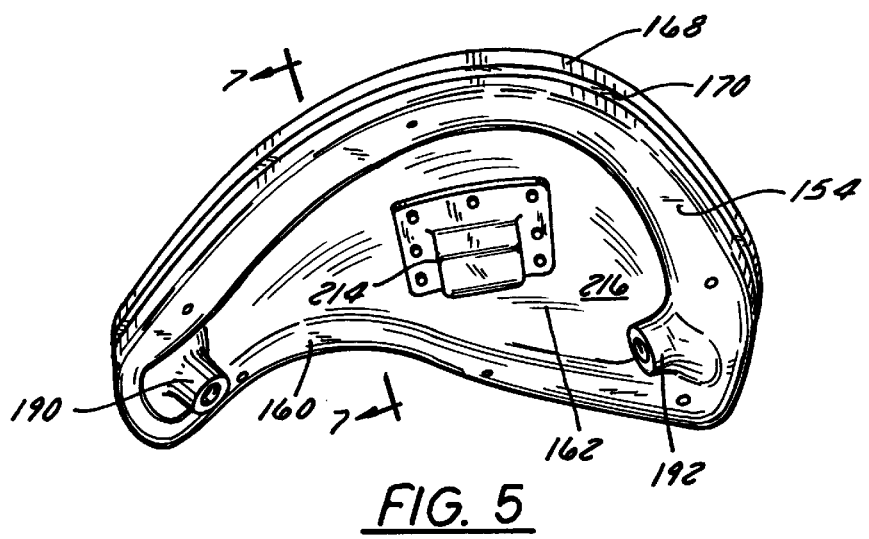
FIG. 5 is a bottom perspective view of the seat making fixture illustrated in FIG. 4.

With reference now to FIG. 3, a self-contained, portable seat making apparatus 100 includes secured to a frame assembly 102, (1) a steam generator 104, (2) a fixture assembly 106, (3) a condenser 108, (4) a water reservoir/air buffer 110 and (5) a controller/power supply 112. Frame assembly 102 is preferably supported on locking casters 114 allowing apparatus 100 to be moved about the production facility with relative ease and secured from movement at the desired location. Apparatus 100 also includes suitable electrical power connectors (not shown) and pressurized air connectors (not shown) for receiving electrical power and compressed, shop air as is well known and commonly available within a manufacturing facility.

Frame assembly 102 includes (1) a lower platform 116, (2) an upper platform 118 secured via vertical frame members 120 above lower platform 116 and (3) a fixture support structure 122 secured to and extending above upper platform 118. As seen in FIG. 1, steam generator 104, condenser 108 and water reservoir 110 are each suitably secured to lower platform 116. Controller/power supply 112 is secured under upper platform 118. Fixture assembly 106 includes a lower fixture portion 124 and a seat support portion 125 secured to upper platform 118 and an upper fixture portion 126 secured to fixture support structure 122 in opposed relationship to lower fixture portion 124. More particularly, fixture support structure 122 includes a cross member 128 secured between standards 130 and 132 that extend vertically above upper platform 118. Secured to upper fixture portion 126 are guide rods 134 and 136, respectively, that slidingly engage apertures 135 and 137, respectively, formed in cross member 128 for guiding upper fixture portion 126 in linear vertical movement with respect to lower fixture portion 124. As shown in FIG. 1, a pneumatic power cylinder 138 is adapted with a drive rod 140 for moving upper fixture portion 126 in linear vertical movement as is known in the art. Alternatively, a manual over-center clamp or other suitable actuator may be employed without departing from the fair scope of the present invention. Lower fixture portion 124 and upper fixture portion 126 are arranged to clamp seat preassembly therebetween with first contoured seating surface 12 engaging lower fixture portion 124 and second contoured seating surface 14 supported on seat support 125.

3. Fixture Assembly

More particularly, and with continued reference to FIG. 3, upper fixture portion 126 includes a backing plate 142 and a seat engaging surface 144. Backing plate 142 is a suitably rigid backing such as composite wood, aluminum or steel plate or backing structure. Seat engaging surface 144 is preferably constructed from fiberglass or similar composite material having a surface shape substantially corresponding to a bottom portion of seat preassembly 10' and is secured to backing plate 142 in a manner well known in the art. Guide rods 136 and 138 and power rod 140 engage suitable fittings 145–147, respectively, formed into backing plate 142. In this manner upper fixture portion 126 firmly and positively engages seat preassembly 10' and applies a downward force thereto for maintaining seat preassembly in firm contact with lower fixture portion 124 and seat support 125 during operation of seat making apparatus 100.

Seat support 125 includes a support surface 148 that has a contour generally complimentary to second contoured seating surface 14. Support surface 148 is supported above upper platform 118 on a stanchion 150. It will be appreciated from the following discussion that seat support 125 may also be formed to include seat forming apparatus described in conjunction with lower fixture portion 124 without departing from the fair scope of the present invention. Seat support 125 is shown as a support in FIG. 3 to simplify the discussion of seat making apparatus 100.

Referring to FIGS. 4–8, lower seat portion 124 includes (1) a base 152, (2) a pressure chamber 154 and (3) a flexible bladder 156. Pressure chamber 154 is secured to base 152 using suitable fasteners (not shown). Of note is the orientation of pressure chamber 154. Pressure chamber is angled with respect to horizontal to facilitate close engagement of flexible bladder 156 with first seating surface 12. It will be appreciated that the orientation of pressure chamber 154 with respect to horizontal will be arranged to optimize engagement of flexible bladder 156 with first seating surface 12. Pressure chamber 154 and flexible bladder 156 also have a peripheral configuration generally corresponding with a periphery of first seating surface 12. Again it will be appreciate that the periphery of pressure chamber 154 and flexible bladder 156 will be arranged to optimize engagement of flexible bladder 156 with first seating surface 12 during operation of seat making apparatus 100. Furthermore, and importantly, pressure chamber 154 and flexible bladder 156 have a generally convex shape again corresponding to the concave contour of first seating surface 12. The convex shape will also be arranged to optimize engagement of flexible bladder 156 with first seating surface 12. The specific configuration shown in the Figures is intended only to identify this feature of the present invention.

Figure 8:
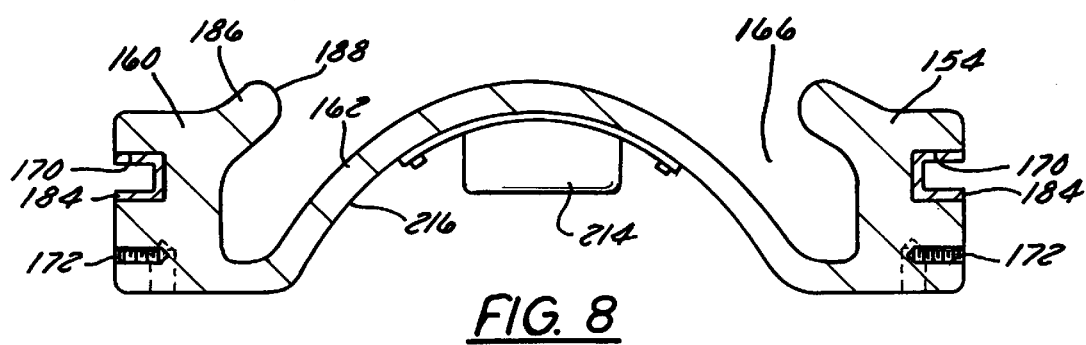
FIG. 8 is a partial view of the cross-section taken along line 6—6 of FIG. 4.
Figure 7:
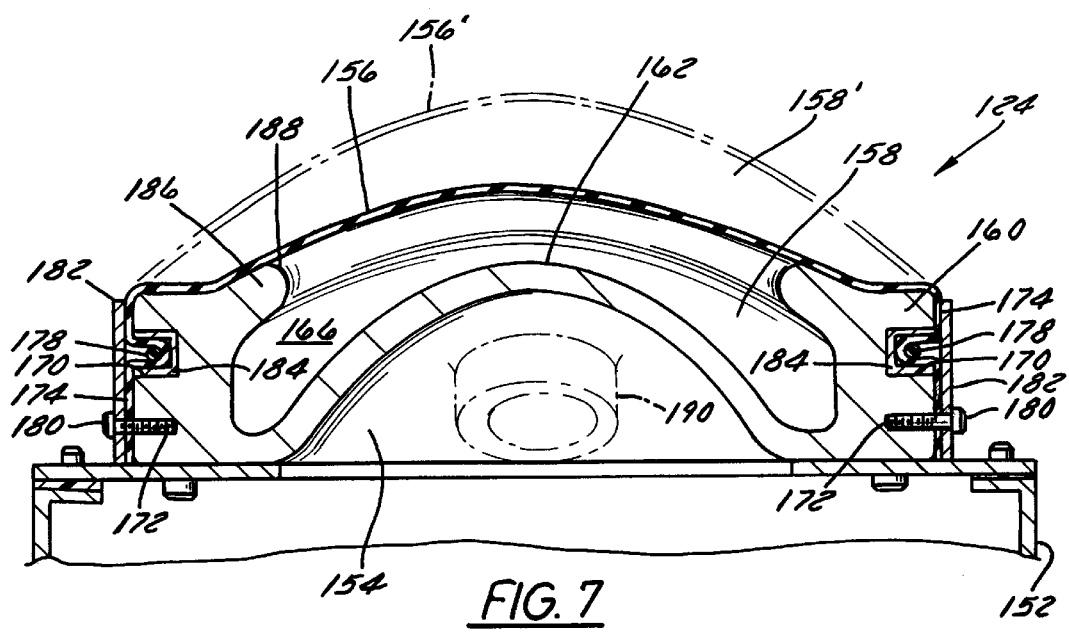
FIG. 7 is a partial cross-section view taken along line 7—7 of FIG. 5.
Figure 6:
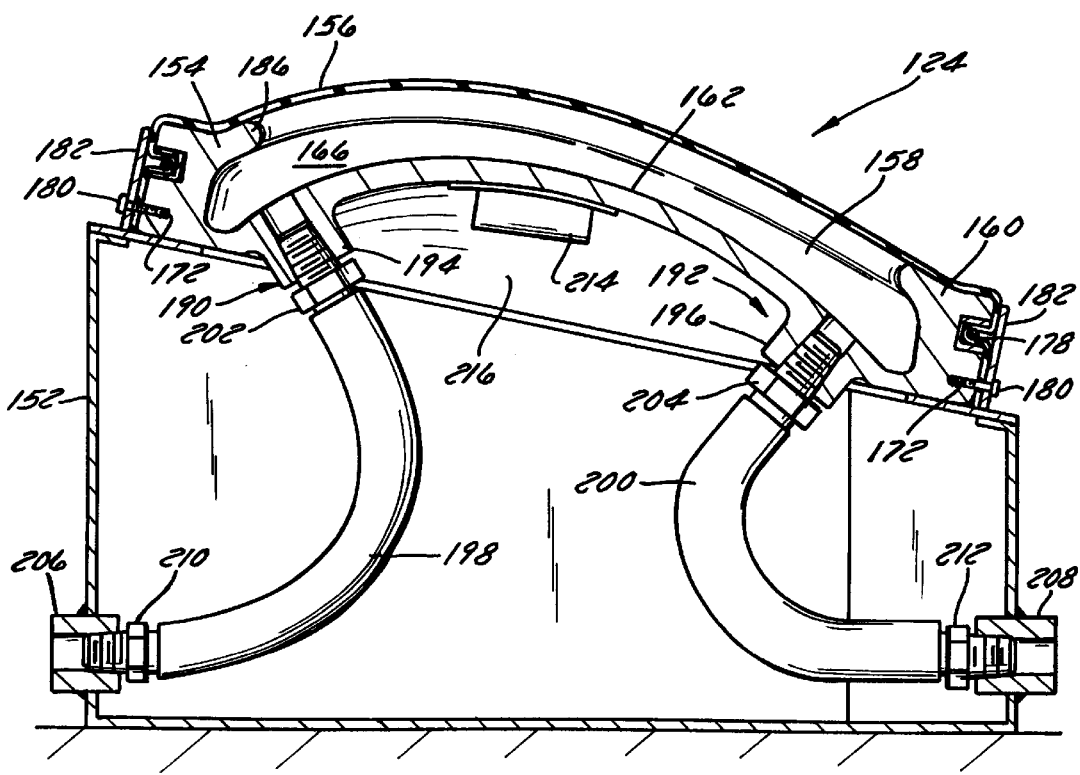
FIG. 6 is a cross-section view taken along line 6—6 of FIG. 4.

Flexible bladder 156 is secured to pressure chamber 154 defining a pressure cavity 158 therebetween (best seen in FIGS. 6 and (7). With particular reference to FIGS. 6–8, pressure chamber 154 is formed from a suitably rigid and pressure resistant material such as aluminum, steel, or most preferably a high-strength composite and includes an peripheral wall portion 160 and a convex bottom 162 each configured to generally correspond with the contoured concave shape of first seating surface 12. Wall portion 160 and convex bottom 162 define a well 166, which, in conjunction with flexible bladder 156 make up cavity 158.

An outer surface 168 of pressure chamber 154 includes a channel recess 170 and a plurality of threaded apertures 172. Channel recess 170 extends continuously around outer surface 168. Flexible bladder 156 includes an outer lip portion 174 that extends over outer surface 168. Outer lip portion 174 is captured by an elastomeric retainer 178 and is retained within channel recess 170. To further secure flexible bladder to pressure chamber 154 and to ensure pressure/fluid tight engagement of flexible bladder to pressure chamber 154, a retaining band 182 surrounds outer lip portion 174, and hence outer surface 168, and is retained to pressure chamber 154 using a plurality of threaded fasteners 180 engaging threaded apertures 172. To prevent damage to flexible bladder 156 and to further ensure a fluid tight seal between flexible bladder 156 and pressure chamber 154, a channel insert 184 is disposed within and sealingly engages channel recess 170. Outer lip portion 174 therefore sealingly engages channel insert 184. In addition, to provide shape to flexible bladder 156 in an unpressurized state, and to prevent damage due to flexible bladder 156 engaging wall portion 160, wall portion 160 includes an inwardly extending tongue 186 about the entire inner periphery of well 166. Tongue 186 is formed to substantially conform to the convex shape of bottom 162 and includes a generous radius at its innermost end 188 to prevent damage to flexible bladder 156. Pressure chamber 154 also includes pressure and temperature probe housing 214 secured to an underside portion 216 of bottom 162. Housing 214 is adapted to accept a variety of pressure and temperature probes capable of providing signals indicative of pressure and temperature in lower fixture portion 124 to controller/power supply 112 for controlling operation of apparatus 100.

Flexible bladder 156 is designed to expand upon pressurization of cavity 158. This feature of the present invention is best seen in FIG. 7. Flexible bladder 156 is shown with cavity 158 in an unpressurized state. Introduction of pressurized fluid into cavity 158 causes an increase in pressure therein and a concomitant expansion of flexible bladder 156. A pressurized flexible bladder 156' illustrates this expansion with pressurized cavity 158' pressurized and also correspondingly enlarged. In accordance with the present invention, pressurized cavity 158' is sequentially pressurized using a heating fluid and then a cooling fluid. With a seat preassembly secured within fixture assembly 106, pressurized flexible bladder 156' bears against first seating surface 12 causing seat cover 26 to come into close, intimate contact with foam substrate 18. Pressurized flexible bladder 156' is first pressurized using a heating fluid. Heat from the heating fluid is conducted to pressurized flexible bladder 156' and thus to seat cover 26 and adhesive layer 24. This heat is sufficient to activate adhesive layer 24. After a period of time, a heating dwell period, pressurized flexible bladder 156' is pressurized using a cooling fluid. The cooling fluid draws heat from seat cover pressurized flexible bladder 156' and likewise from seat cover 26 and adhesive layer 24. This causes adhesive layer 24 to set thereby bonding seat cover 26 to foam substrate 18. Cooling fluid is preferably introduced without a substantial pressure drop within pressurized cavity 158' and evacuates the heating fluid. This ensures that during the bonding process several pounds per square inch pressure is continuously urging seat cover 26 against foam substrate 18 during both the heating portion and the cooling portion of the process. It will be appreciated that some mixing of heating and cooling fluid may occur. After a period of time, a cooling dwell period if required, pressure is relieved from and flexible bladder 156 returns to its unpressurized state.

To facilitate introduction of pressurized heating fluid and pressurized cooling fluid into cavity 158 pressure chamber 154 is formed to include an inlet coupling 190 and an outlet coupling 192. Each of coupling 190 and 192 preferably include a fitting 194 and 196, respectively, formed integral to pressure chamber 154 and into which a suitable threaded pressure coupling (not shown) is inserted and secured. An inlet pressure hose 198 and an outlet pressure hose 200 are respectively coupled to coupling 190 and 192 via threaded pressure couplings 202 and 204, respectively. A second end of each of pressure hose 198 and pressure hose 200 couple via threaded pressure couplings 210 and 212, respectively, to a fixture inlet coupling 206 and a fixture outlet coupling 208 formed into base 152. This feature of the present invention allows pressure chamber 154 including flexible bladder 156 to be easily removed from base 152 and another pressure chamber, potentially having a different configuration for manufacturing a different seat assembly, to be installed on base 152. Similarly, the entire lower fixture portion 124, including base 152, pressure chamber 154 and flexible bladder 156, may be removed from apparatus 100 and replaced. Thus, it is appreciated that apparatus 100 may be easily adapted for manufacturing any number of seat assemblies by constructing fixtures of appropriate configurations. Moreover, apparatus 100 may be adapted for bonding virtually any material to virtually any substrate by providing an appropriate fixture arrangement.

4. Heating Fluid and Cooling Fluid Supply System

Figure 9:
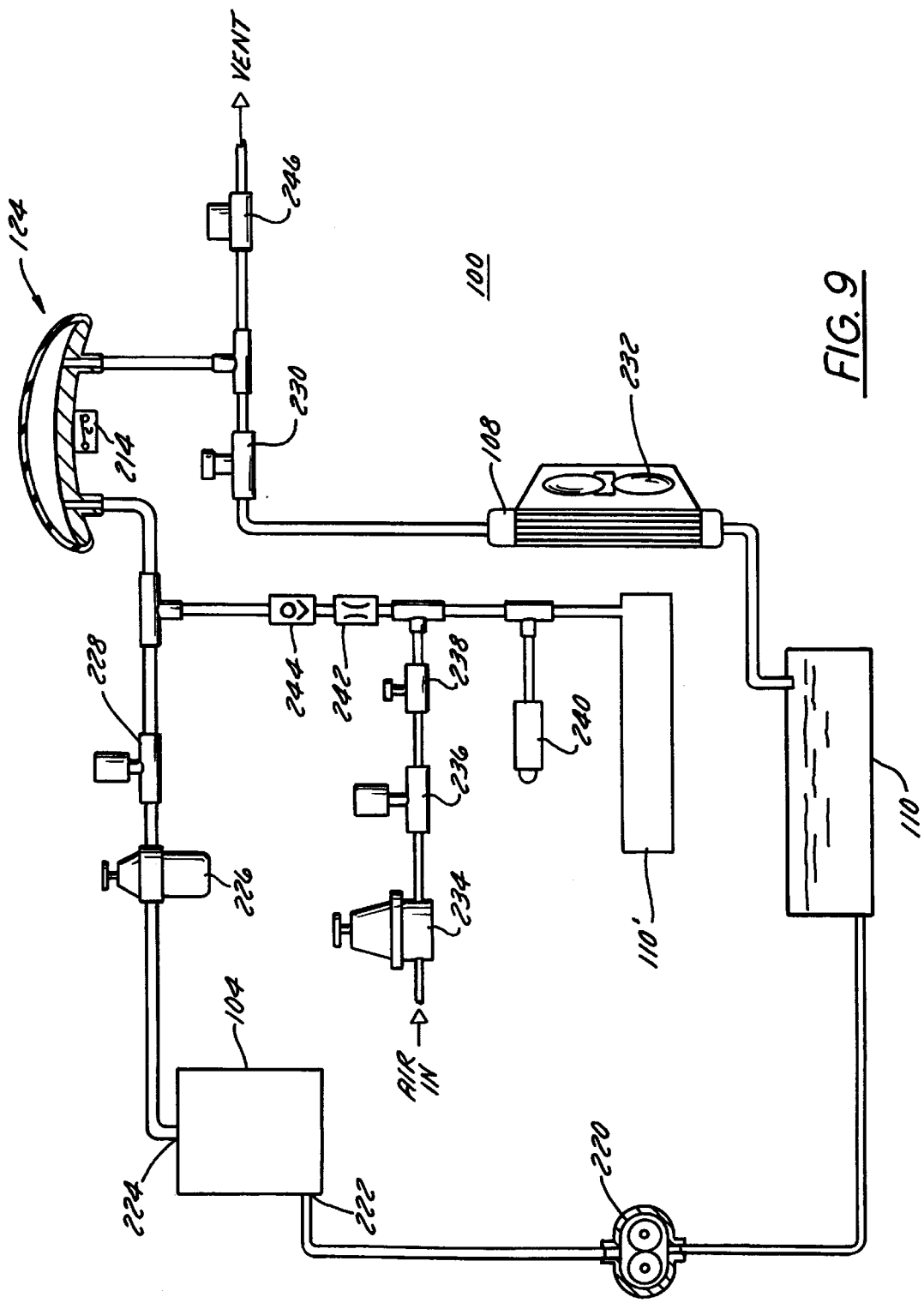
FIG. 9 is a schematic representation of the seat making apparatus illustrated in FIG. 3.

In accordance with a preferred embodiment of the present invention, apparatus 100 is a substantially self-contained piece of equipment. In the preferred embodiment shown in FIG. 3, only electrical and shop (pressurized) air connections are required for operation. It should be appreciated that an on-board air compressor may be provided, and in which case, only a source of electricity would be required to operate the apparatus. Referring to FIG. 9, a schematic of apparatus 100 illustrates the functional elements including steam generator 104, condenser 108, reservoir 110 and lower fixture portion 124. It will be appreciated that suitable interconnection of the elements of apparatus 100 may be accomplished using rigid conduit, flexible tubing, pressure hose, and the like as is well known in the art.

While it will be appreciated that virtually any source of heating fluid, such as heated air, heated liquid, and the like may be used without departing from the fair scope of the present invention, a preferred embodiment uses steam as a heating fluid. A preferred source of steam is steam generator 104, preferably a Reimer Model AR8 portable steam generator (available from Reimer, Inc. P.O. Box 37, Clearbrook, Va. 22624) using approximately 8 kilowatts at 240 or 120 volts. Steam generator 104 receives a supply of water from reservoir 110 via pump 220. An alternate preferred steam generator, the Reimer AR8-pump, has an integral pump and advantageously eliminates the requirement for a separate pump. Steam generator 104 operates in accordance with its specifications to provide a supply of steam at about 60–80 pounds/square inch (PSI). Steam exits steam generator 104 at steam output 224 and is conducted to lower fixture portion 124 via regulator 226 and solenoid valve 228 where it pressurizes cavity 158. From lower fixture portion 124, the steam is conducted to condenser 108 via needle flow control valve 230. Condensed steam is then communicated to reservoir 110.

The introduction of steam into lower fixture portion 124 controlled by operation of solenoid valve 228, while pressure within lower fixture portion 124 is controlled by metering the flow of steam at a regulated pressure through lower fixture portion by needle flow control valve 230. In a preferred embodiment of the present invention, cavity 158 is pressurized to between about 1 to 5 PSI, and most preferably about 2 to 3 PSI. An vent valve 246 is provided, and in the event that pressure within cavity 158 exceeds a threshold value or an stop command is otherwise initiated, cavity 158 is evacuated upon the opening of vent valve 246.

Steam from lower fixture portion 124 is communicated to condenser 108. Condenser 108 may be adapted from an automotive radiator having sufficient capacity arranged adjacent an electrically powered fan 232. Most preferably, condenser 108 has a top inlet, a lop vent, and a bottom drain. The top inlet is directly coupled to the output of needle flow control valve 230. The top vent is coupled to reservoir 110 (via conduit not shown) and the bottom drain is coupled to reservoir 110. Condensed steam, in liquid form, is communicated directly from bottom drain to reservoir 110. Vent steam, air and vapor are also communicated to via top vent to reservoir 110. In this manner, a single outlet from lower fixture portion 124 may be advantageously arranged to evacuate both pressurizing steam, and as will be explained, pressurized cooling air. As will be further appreciated, the steam generation function of the present invention is substantially self-contained within apparatus 100. This reduces maintenance, i.e., adding water or providing a supply water connection, and reduces hazards that may be created from venting steam to the working environment.

Shop air is communicated via regulator 234, solenoid valve 236, needle flow control valve 238, vortex tube 242 and check valve 244 into lower fixture portion 124. Solenoid valve 236 controls the introduction of pressurized air into lower fixture portion 124, while pressure within lower fixture portion 124 is controlled by metering the flow of pressurized air at a regulated pressure through lower fixture portion by needle flow control valve 218. Check valve 244 is provided to prevent the back flow of steam into the pressurized air supply system. Vortex tube 242, while preferred but not required may be provided to cool the pressurized air by introducing a pressure drop (available from Exair Corporation, Cincinnati, Ohio). It will be appreciated that other methods of sources of cooling fluid may be used such as chilled water, chilled water/air exchangers, direct expansion chillers and the like may be used without departing from the fair scope of the present invention. During introduction of pressurized air, excess airflow is vented via air vent 240, and pressure fluctuations are limited by air buffer 110' (shown formed integral to reservoir 110 in FIG. (3). Pressurized air is communicated from lower fixture portion 124 via needle flow control valve 230 into condenser 108. Within condenser 108, air evacuated from lower fixture portion 124 is vented via the top vent, and any entrained vapor is communicated to reservoir 110. Vent valve 246 remains operable to depressurize lower fixture portion 124 in an over pressure or other stop condition.

Thus, apparatus 100 is adapted to introduce into lower fixture portion 124 heating fluid (steam), to dwell during a heating period (if required), to introduce cooling fluid (pressurized air), to dwell for a cooling period (if required), and to evacuate lower fixture portion at the end of a cycle. In this manner, apparatus 100 is uniquely adapted for solving the problem of firmly, accurately, permanently and economically bonding a seat cover to a foam substrate. It accomplishes the tasks of heating the seat assembly to activate the adhesive and cooling the seat assembly to set the adhesive within a single fixture. In addition, using steam as a heating fluid and pressurized air as a cooling fluid allows use of cost effective and available thermoplastic adhesives and provides fast cycle times so as to make the manufacturing process economically feasible.

5. Operation and Use

Figure 10:
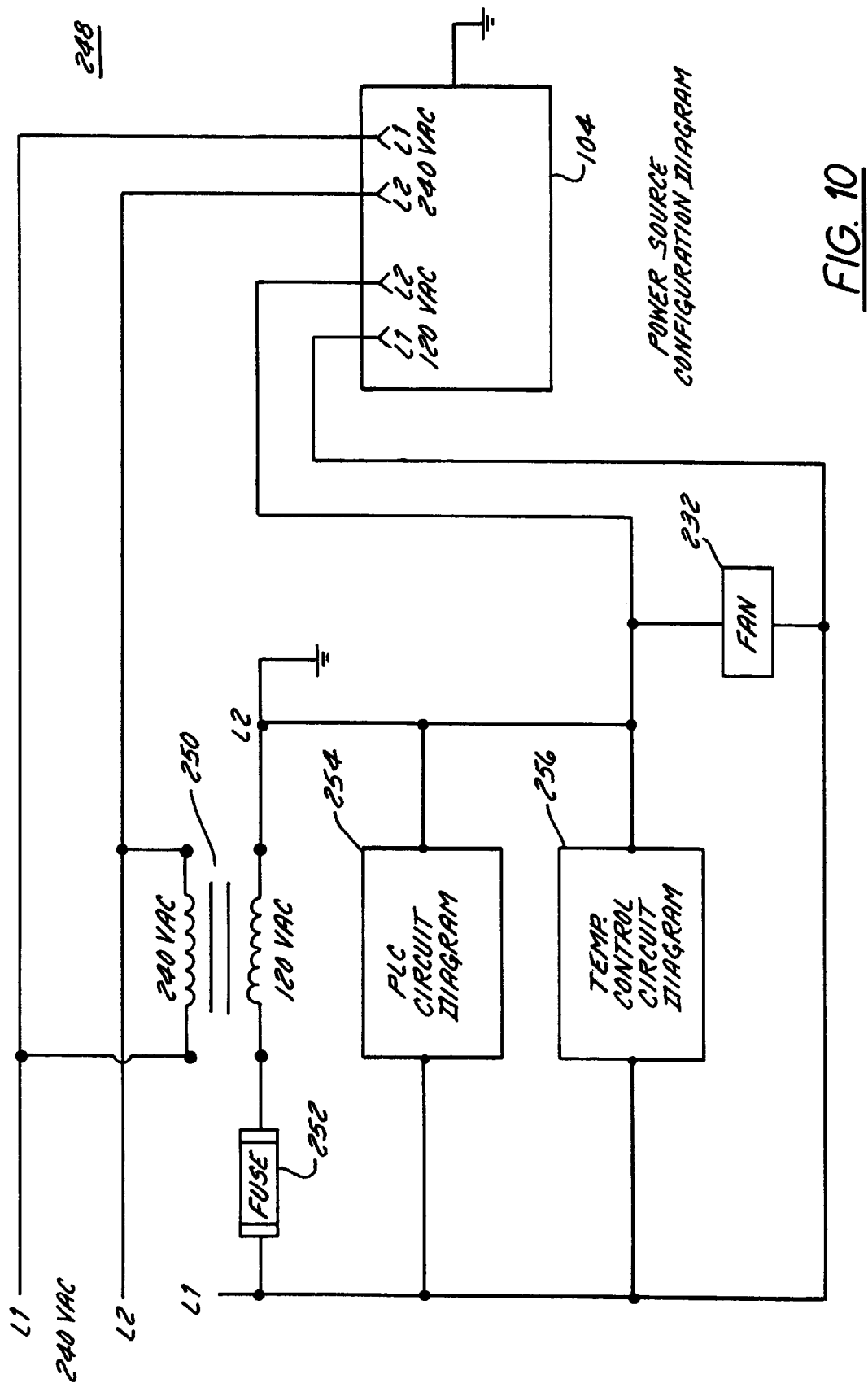
FIG. 10 is a schematic diagram of a power circuit for the apparatus illustrated in FIG. 3.

Operation of apparatus 100 is preferably controlled through use of controller/power supply 112. Controller/power supply 112 includes a number of power and control elements and with reference to FIG. 10, electrical power, 240 VAC, is provided to controller/power supply 112 and is coupled to power circuit 248. Power circuit 248 includes a voltage transformer 250 and fuse 252 for providing fused 120 VAC electrical power to programmable logic controller 254, temperature controller 256, fan 232 and stream generator 104. Power circuit 248 also provides 240 VAC directly to steam generator 104.

Figure 11:
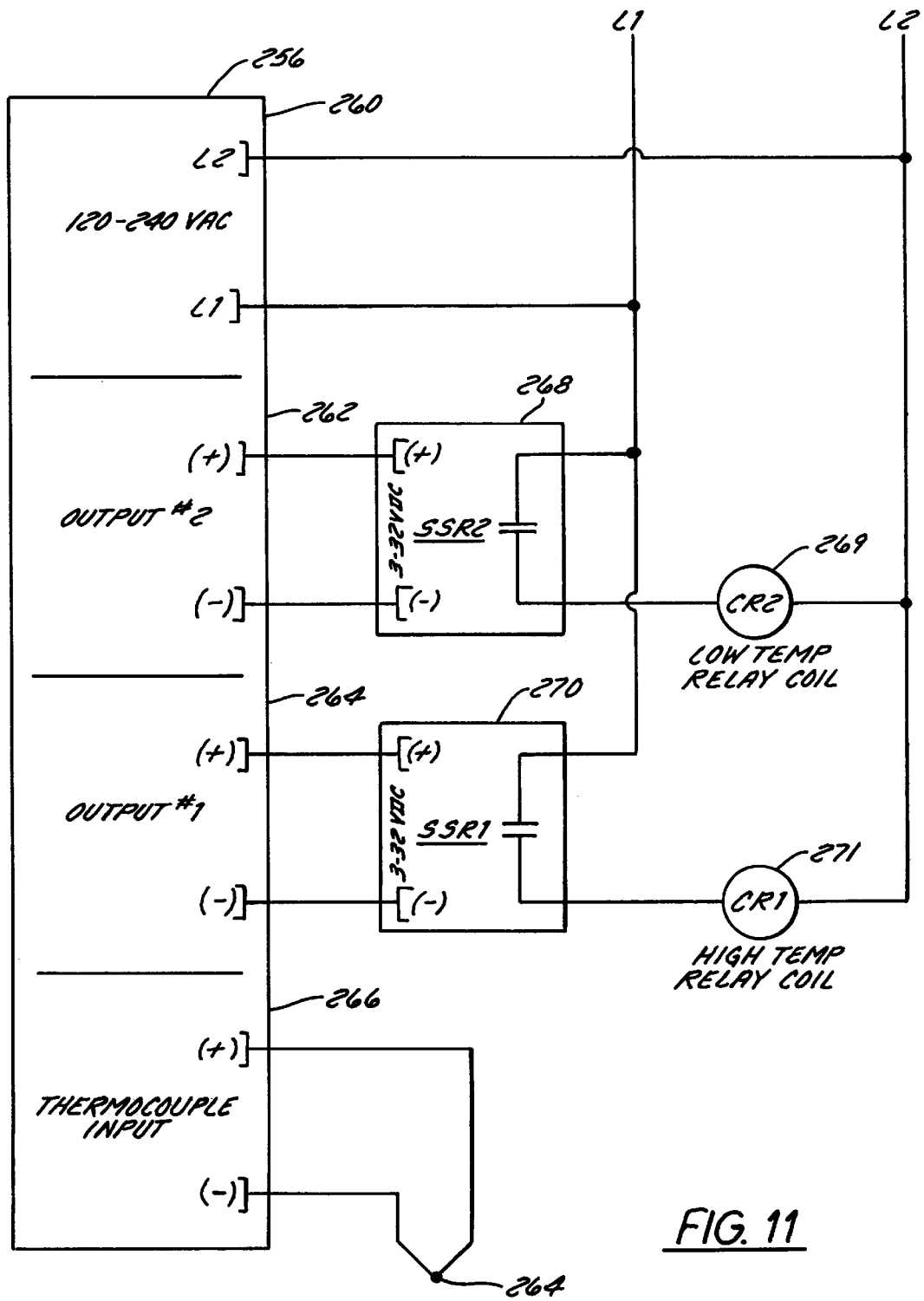
FIG. 11 is a schematic diagram of a temperature controller for the apparatus illustrated in FIG. 3.

With reference to FIG. 11, temperature controller is preferably a Watlow 935A-1CC0-000R temperature controller and includes (1) a voltage input 260, (2) a first output 264, (3) a second output 266 and (4) a thermocouple input 268. Thermocouple 268 is arranged to monitor the temperature within lower fixture portion 124 and particularly cavity 158. The outputs are arranged to provide two temperature threshold signals, temperature high and temperature low. In response, respectively, to a temperature low or a temperature high condition, relay 268 and relay 270 respectively energize coil 269 and coil 271 closing associated contacts 269' and 271' (FIG. 12) for providing a signal to PLC 254.

Figure 12:
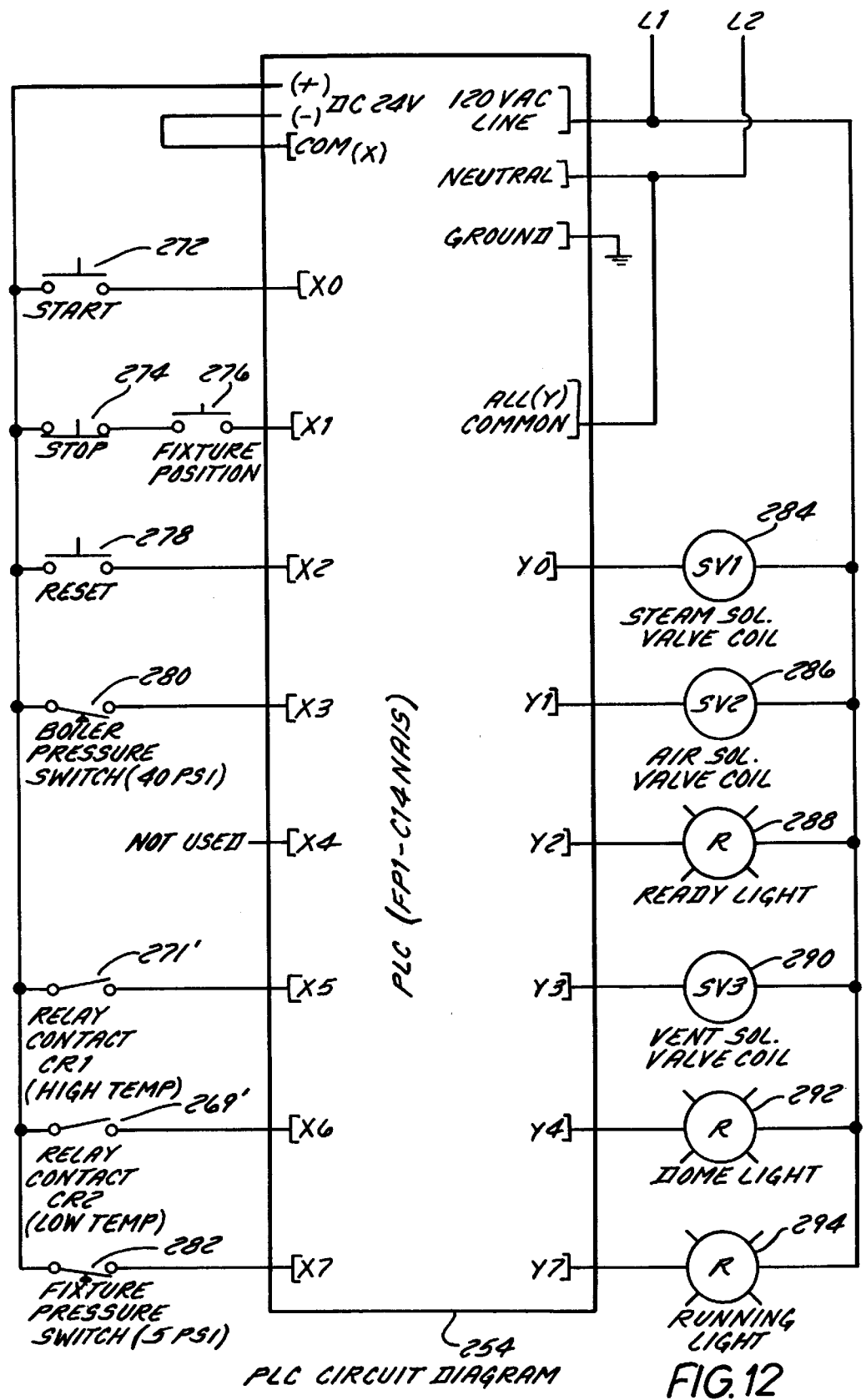
FIG. 12 is a schematic diagram of a programmable logic controller circuit for the apparatus illustrated in FIG. 3.
Figure 13:
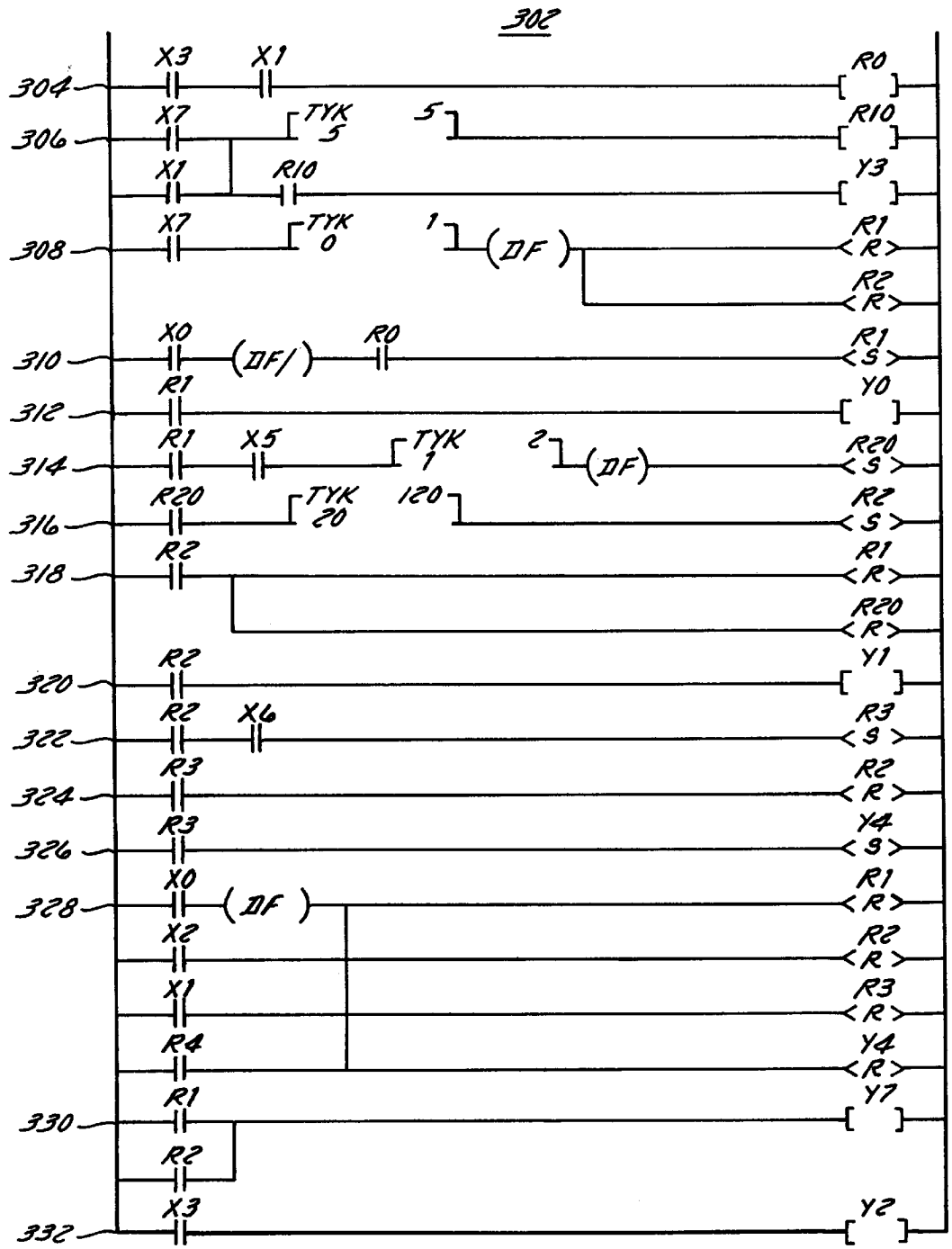
FIG. 13 is a ladder logic diagram illustrating control logic for preferred operation of the apparatus illustrated in FIG. 3.

With reference now to the schematic diagram shown in FIG. 12, the ladder-logic diagram shown in FIG. 13 and Table I below, a preferred mode of operation of apparatus 100 will be described. PLC 254 is preferably a Matsushita FP1-C14 NAIS PLC. PLC 254 is arranged with inputs for receiving electrical power and for coupling to ground. PLC 254 is also arranged to receive inputs from (1) a start button 272, (2) an emergency stop button 274, (3) a fixture position switch 276, (4) a reset button 278, (5) a boiler pressure low switch 280, (6) steam high temperature contacts 271', (7) steam low temperature contacts 269' and (8) fixture excess pressure switch 282. PLC 254 outputs include (1) a steam valve solenoid coil 284, (2) a air valve solenoid coil 286, (3) a ready light 288, (4) an emergency vent valve solenoid coil 290, (5) a cycle done light 292 and (6) an apparatus running light 300. It will be appreciated that the aforementioned buttons and lights are provided and arranged on apparatus 100 in accordance with workplace practice standards. Coil devices are associated with their respective contacts and/or valves. Switches are preferably normally open, normally closed, and condition actuated as shown in FIG. 12.

Table I (below) illustrates the correlation between the elements shown in FIG. 12 and legends used in the ladder logic diagram 302 shown in FIG. 13. In operation, a seat preassembly 10' is secured within fixture assembly 106, and at line 304, steam pressure must exceed the setting of the steam pressure switch 280, which in a preferred embodiment is set to a minimum threshold of about 40 PSI before apparatus 100 is permitted to cycle. Next, at lines 306 and 308, if stop button 274 is pressed or fixture switch 276 is open, i.e., the upper fixture portion 126 is not secured in a lowered position relative to lower fixture portion 124 securing seat preassembly 10', or if fixture pressure switch 282 is closed, i.e., fixture pressure exceeds a predetermined setting in the preferred embodiment about 5 PSI, vent valve 246 is opened by energizing vent valve solenoid coil 290. If the fixture pressure continues to exceed the setting for more than one second, operation is stopped and apparatus 100 is reset. If stop button 274 is pressed and held or upper fixture portion 126 remains out of position for more than five seconds, vent valve solenoid coil 290 is deenergized.

At lines 310 and 312, when start button 272 is pressed and released, steam solenoid valve coil 284 is energized opening steam solenoid valve 228 to allow steam to flow into lower fixture portion 124. At lines 314–316, when fixture temperature rises to the high setting, indicated by contact 271' closing, and remains at temperature for two seconds, a two minute dwell timer is set. Steam solenoid valve 228 remains open until expiration of the timer. During this time, lower fixture portion 124 is pressurized with steam, the pressurized flexible bladder 156' bears against seat cover 26 urging it against foam substrate 18, and heat from the steam activates adhesive layer 24.

At line 318 the dwell timer times out. At lines 320–326, air solenoid valve 236 is opened by energizing air solenoid valve coil 286 and pressurized air flows into lower fixture portion 124. Steam solenoid valve 228 is closed by deenergizing steam solenoid valve coil 284. Lower fixture portion 124 is pressurized with cooling air, the pressurized flexible bladder 156' bears against seat cover 26 urging it against foam substrate 18, and heat is removed from lower fixture portion 124, and likewise seat preassembly 10' cooling and setting adhesive layer 24. When the fixture temperature falls below the low temperature threshold, indicated by contacts 269' closing, done lamp 292 is illuminated until apparatus 100 is reset. Fixture assembly 106 is opened and a finished seat assembly 10 is removed. A cooling dwell period may be introduced, if necessary, to ensure complete setting of the adhesive layer.

At line 328, apparatus 100 is reset by one of the following occurring: (1) start button 272 is pressed, (2) reset button 278 is pressed, (3) stop button 274 is pressed or (4) fixture switch 276 opens, i.e., upper fixture portion 126 is raised away from lower fixture portion. At line 330, running lamp 300 is illuminated if phase one relay (R1) or phase two relay (R2) is active. Phase one relay (R1), phase two relay (R2) and phase three relay (R3) are internal to PLC 254 and are utilized in indicating operation of apparatus 100. At line 332, ready lamp 288 is illuminated when sufficient steam pressure is available, i.e., steam pressure switch 280 is closed. Thus, upon completion of a seat assembly 10, opening fixture assembly 106 to remove seat assembly 10 resets apparatus 100 and readies it for another operation. One will appreciate that numerous operational modifications may be made without departing from the fair scope of the present invention.

TABLE I

| ELEMENT | DESCRIPTION |
| --- | --- |
| X0 | START BUTTON |
| X1 | EMERGENCY STOP |
| X2 | RESET ALL |
| X3 | STEAM PRESSURE |
| X5 | TEMPERATURE HIGH |
| X6 | TEMPERATURE LOW |
| X7 | HIGH FIXTURE PRESSURE |
| Y0 | STEAM SOLENOID VALVE |
| Y1 | AIR SOLENOID VALVE |
| Y2 | READY LAMP |
| Y3 | VENT SOLENOID VALVE |
| Y4 | DONE LAMP |
| Y7 | RUNNING LAMP |
| R0 | EMERGENCY STOP HIGH PRESSURE |
| R1 | PHASE ONE |
| R2 | PHASE TWO |
| R3 | PHASE THREE |
| R4 | LOW PRESSURE RESET |
| R10 | VENT DISABLE |
| R20 | DWELL |

Many changes and modifications could be made to the invention without departing from the fair scope and spirit thereof. For example, apparatus 100 may be adapted for bonding virtually any covering to virtually any contoured substrate. Changes in operating times, temperatures and pressures may be made. The scope of some additional changes is discussed above. The scope of others will become apparent from the appended claims.

We claim:

1. A method of making a seat comprising the steps of:
preassembling said seat by positioning a seat cover over a contoured foam substrate, said contoured foam substrate defining a contoured seating surface and having a layer of heat activated adhesive applied over said contoured seating surface;
securing said seat in a fixture, said fixture having a contoured surface complimentary to said contoured seating surface;
introducing heating fluid into said fixture to pressurize an elastomeric bladder against said seat, said pressurized bladder urging said seat cover against said contoured foam substrate and heating said adhesive layer; and
introducing cooling fluid into said fixture to pressurize said elastomeric bladder against said seat, said pressurized bladder urging said seat cover against said contoured foam substrate and cooling said adhesive layer.

2. The method of claim 1, said step of introducing cooling fluid comprising concomitantly evacuating said heating fluid from said fixture.

3. The method of claim 2, comprising the steps of evacuating said cooling fluid from said fixture and removing said seat from said fixture.

4. The method of claim 1, wherein said pressurized bladder applies between about 1 pounds to about 5 pounds of pressure per square inch against said seat cover.

5. The method of claim 1, wherein said pressurized bladder applies about 2 pounds to about 3 pounds of pressure per square inch against said seat cover.

6. The method of claim 1, comprising after the step of introducing heating fluid the step of dwelling for a time period.

7. The method of claim 1, comprising after the step of introducing cooling fluid the step of dwelling for a time period.

8. The method of claim 1, wherein said heating fluid comprises steam.

9. The method of claim 1, wherein said cooling fluid comprises pressurized air.

10. A method of making a seat comprising the steps of:
preassembling said seat by positioning a seat cover over a contoured foam substrate, said contoured foam substrate defining a contoured seating surface and having a layer of heat activated adhesive applied over said contoured seating surface;
securing said seat in a fixture, said fixture having a contoured surface complimentary to said contoured seating surface;
introducing steam into said fixture to pressurize an elastomeric bladder against said seat, said pressurized bladder urging said seat cover against said contoured foam substrate and heating said adhesive layer; and
introducing pressurized air into said fixture to pressurize said elastomeric bladder against said seat, said pressurized bladder urging said seat cover against said contoured foam substrate and cooling said adhesive layer.

11. The method of claim 10, said step of introducing pressurized air comprising concomitantly evacuating said steam from said fixture.

12. The method of claim 11, wherein during said step of introducing pressurized air, said bladder being pressurized by a mixture of said steam and said air.

13. The method of claim 12, comprising the steps of evacuating said pressurized air from said fixture and removing said seat from said fixture.

14. The method of claim 10, wherein said pressurized bladder applies between about 1 pounds to about 5 pounds of pressure per square inch against said seat cover.

15. The method of claim 10, wherein said pressurized bladder applies about 2 pounds to about 3 pounds of pressure per square inch against said seat cover.

16. The method of claim 10, comprising after the step of introducing steam the step of dwelling for a predetermined time period.

17. The method of claim 10, comprising after the step of introducing steam the step of dwelling until a temperature of said fixture exceeds a threshold.

18. The method of claim 10, comprising after the step of introducing pressurized air the step of dwelling for a predetermined time period.

19. The method of claim 10, comprising after the step of introducing pressurized air the step of dwelling until a temperature of said fixture falls below a threshold.

20. The method of claim 10, said step of preassembling said seat comprising:
a) applying said layer of heat activated adhesive to said foam substrate;
b) placing said seat cover over said foam substrate;

c) drawing said seat cover taut; and d) securing said seat cover to said form substrate about a periphery of said foam substrate.

21. The method of claim 20, said step of preassembling said seat comprising prior to said step of applying said layer of heat activated adhesive the step of applying a water resistant layer to said foam substrate.

22. The method of claim 10, said step of introducing steam comprising introducing steam from a steam source proximately located to said fixture.

23. The method of claim 22, comprising the step of said condensing said steam to liquid and providing said liquid to said steam source.

24. The method of claim 10, said step of introducing pressurized air comprising cooling said pressurized air.

25. The method of claim 24, said step of cooling said pressurized air comprising passing said pressurized air through a flow restriction device prior to introducing said pressurized air into said fixture.

26. The method of claim 10, further comprising providing a controller, said controller arranged to provide control signals for controlling said introduction of steam and said introduction of pressurized air to said fixture.

27. A method of making a seat comprising the steps of:

preassembling said seat by positioning a seat cover over a contoured foam substrate, said contoured foam substrate defining a contoured seating surface and having a layer of heat activated adhesive applied over said contoured seating surface;

securing said seat in a fixture, said fixture having a contoured surface complimentary to said contoured seating surface;

introducing steam into said fixture to pressurize an elastomeric bladder against said seat, said pressurized bladder urging said seat cover against said contoured foam substrate and heating said adhesive layer;

dwelling while maintaining a pressure within said pressurized bladder with said steam;

introducing pressurized air into said fixture to maintain said pressure within said pressurized bladder and concomitantly evacuate said steam, said pressurized bladder urging said seat cover against said contoured foam substrate and cooling said adhesive layer;

dwelling while maintaining said pressure within said pressurized bladder with said pressurized air;

evacuating said pressurized air from said fixture; and removing said seat from said fixture.

28. The method of claim 27 said step of dwelling while maintaining a pressure within said pressurized bladder with said steam comprises dwelling for a predetermined time period.

29. The method of claim 27 said step of dwelling while maintaining a pressure within said pressurized bladder with said steam comprises dwelling until a temperature of said fixture exceeds a threshold.

30. The method of claim 27 said step of dwelling while maintaining said pressure within said pressurized bladder with said pressurized air comprises dwelling for a predetermined time period.

31. The method of claim 27 said step of dwelling while maintaining said pressure within said pressurized bladder with said pressurized air comprises dwelling until a temperature of said fixture falls below a threshold.

32. A method of making a seat comprising the steps of:

preassembling said seat by positioning a seat cover over a contoured foam substrate, said contoured foam substrate defining a contoured seating surface and having a layer of heat activated adhesive applied over said contoured seating surface;

securing said seat in a fixture, said fixture having a contoured surface complimentary to said contoured seating surface;

introducing steam from a proximately located source of steam into said fixture to pressurize an elastomeric bladder against said seat, said pressurized bladder urging said seat cover against said contoured foam substrate and heating said adhesive layer;

introducing pressurized air into said fixture to maintain said pressure within said pressurized bladder and concomitantly evacuate said steam, said pressurized bladder urging said seat cover against said contoured foam substrate and cooling said adhesive layer;

evacuating said pressurized air from said fixture;

removing said seat from said fixture; and condensing said evacuated steam to liquid and providing said liquid to said proximately located source of steam.

33. The method of claim 32, wherein said step of introducing pressurized air comprises cooling said pressurized air.

34. The method of claim 32, wherein said step of introducing pressurized air comprises passing said pressurized air through a flow restriction device.

* * * * *